United States Patent [19]

Garrett

[11] 4,306,880
[45] Dec. 22, 1981

[54] RECOVERING BY-PRODUCTS FROM SEA WATER BRINES AND THE LIKE

[76] Inventor: Donald E. Garrett, 110 N. Bristol Rd., Ojai, Calif. 93023

[21] Appl. No.: 944,906

[22] Filed: Sep. 22, 1978

[51] Int. Cl.³ .............................................. B01D 9/02
[52] U.S. Cl. .................................. 23/295 S; 23/298; 23/302 T; 23/305 R; 23/303
[58] Field of Search ............. 423/551, 552; 23/295 S, 23/296, 298, 303, 302 T, 302 R, 305 R; 159/45, 47 R, DIG. 38

[56] References Cited

U.S. PATENT DOCUMENTS

| | | | |
|---|---|---|---|
| 1,328,418 | 1/1920 | Burnham | 23/295 S |
| 1,593,038 | 7/1926 | Silsbee | 23/295 S |
| 3,528,767 | 9/1970 | Garrett | 423/208 |
| 3,615,259 | 10/1971 | Neitzel | 23/295 S |
| 4,072,472 | 2/1978 | Lukes | 23/295 S |

FOREIGN PATENT DOCUMENTS 2543721  4/1977  Fed. Rep. of Germany ...... 423/551

Primary Examiner—Hiram Bernstein
Attorney, Agent, or Firm—Kenneth J. Hovet

[57] ABSTRACT

The improved production of sodium sulfate, potassium sulfate and other valuable salts from salt plant bitterns or the like wherein initial reduction in sulfate ion concentration yields salt cake and greatly facilitates the selective recovery of potassium and other valuable by-product salts. The process includes cooling the bitterns while below a certain concentration to produce glauber salt, followed by successive solar evaporation steps to yield harvestable potash salts. The salts are selectively treated and then refined by flotation. The flotation overflow is converted to potassium sulfate product by decomposition and crystallization steps and the underflow provides a recycle salt mixture for converting the glauber salt to salt cake.

23 Claims, 1 Drawing Figure

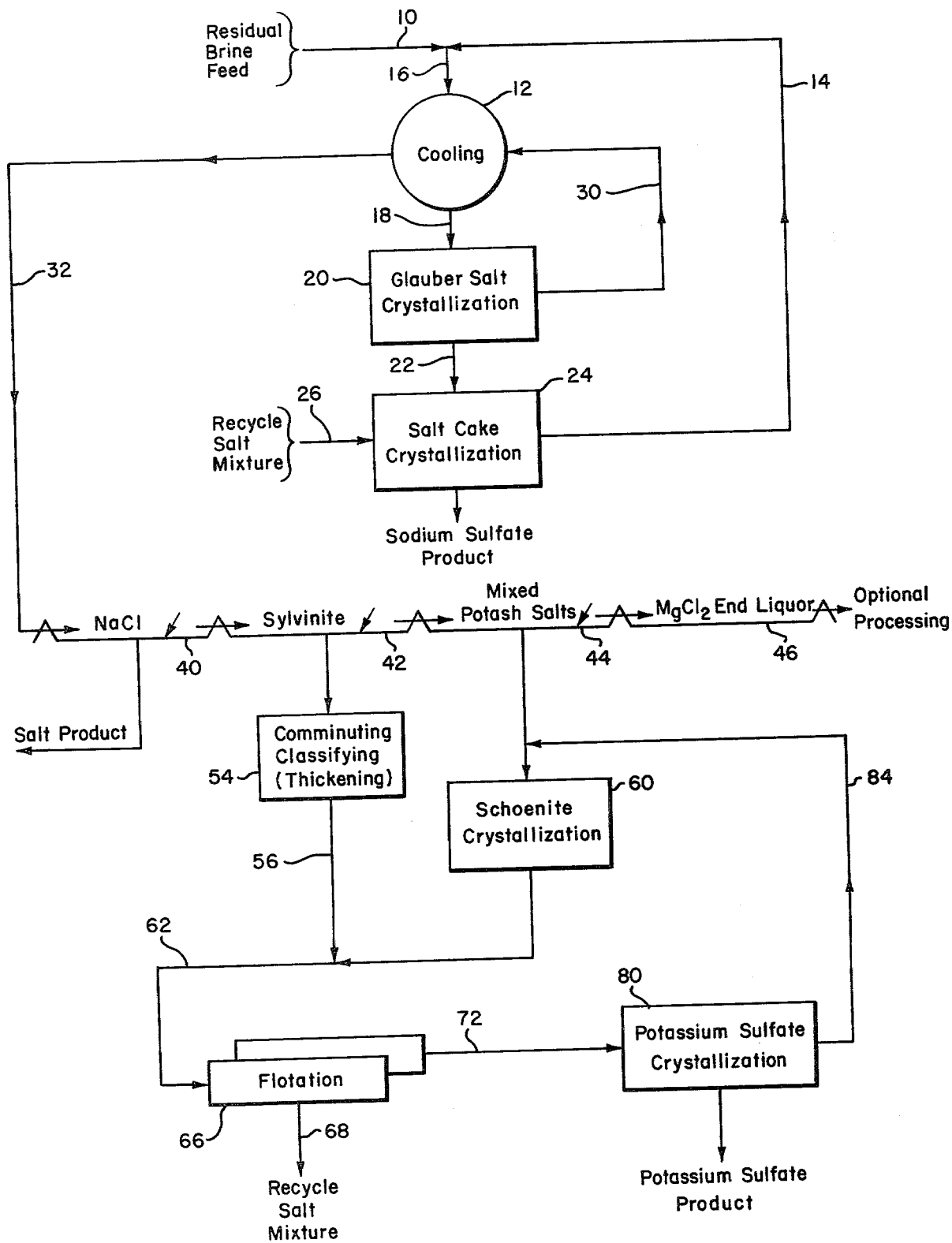

RECOVERING BY-PRODUCTS FROM SEA WATER BRINES AND THE LIKE

BACKGROUND OF THE INVENTION

1. Field of the Invention

The present invention relates to improvements in recovering valuable by-products from mixed salt-rich aqueous solutions and, more particularly, to the production of potassium sulfate and sodium sulfate from sea water brines, natural bitterns or the like.

2. Description of the Prior Art

There are numerous solar salt facilities around the world operating under a wide variety of plant sizes and operating conditions. Such facilities, however, have not been expanded to recover by-product salts from their residual brines because of the complexity of the salts contained therein and the comparatively large expenditures of capital equipment that would be necessitated under current technology to recover significant quantities of valuable by-product salts. Additionally, by-product recovery is exacerbated by the fact that potassium salt concentrations in residual brines is low and such potassium usually crystallizes in the form of various double salts mixed with magnesium sulfate and sodium chloride.

One system which discloses a variety of processing techniques for the recovery of valuable potassium salts is U.S. Pat. No. 3,528,767. This patent describes the solar evaporation of bitterns with sequential segregation of the precipitating salts so that various potash-rich fractions may be isolated and processed separately. The processing includes suitable crushing and classification followed by a flotation separation. When it is desired to produce potassium sulfate as an end-product, generally the potassium salts are converted to schoenite which is subsequently converted with hot water or aqueous potassium chloride solutions to yield the potassium sulfate product. A problem with the aforementioned processing is that the salts which are precipitated in the evaporation ponds do not provide any simple method or opportunity for producing sodium sulfate.

SUMMARY OF THE INVENTION

This invention comprehends a significantly improved process which is commercially feasible for use with bitterns having a significant potassium concentration. The process involves the initial reduction of sulfate ion concentration in a feedstock brine from a range of about 10-15 moles per 1000 moles water to about 6-9 moles per 1000 moles water. This is accomplished by cooling the brine having a concentration of less than about 20 moles per 1000 moles of water into a metastable zone so that only glauber salt ($Na_2SO_4.10H_2O$) crystallizes, and then producing salt cake ($Na_2SO_4$) by salting out with a recycle salt epsomite mixture from a later schoenite flotation step.

By removing part of the sulfate ion in the above manner salt (NaCl) crystals, which may be subsequently recovered by solar pond evaporation to improve overall salt plant yield, will not be contaminated by sulfate. Additionally, initial sulfate removal allows the first potassium salt produced from a subsequent pond evaporation step to be sylvinite which can thereafter be harvested separately. The recovery of a sylvinite-rich fraction provides a highly significant advantage in that it may be subsequently combined with schoenite with a flotation purifying step to produce high yields of potassium sulfate. A still further significant advantage is that the reject salts from the flotation step comprises the recycled salt mixture used to salt-out sodium sulfate at the beginning of the process.

DESCRIPTION OF PREFERRED EMBODIMENTS

The flow sheet on the accompanying drawing represents a preferred embodiment for carrying out the present invention. Brine is taken from a salt processing plant at a specific gravity or density of about 29° Be or less. At this density it will be understood that substantially all gypsum and a major portion of salt (NaCl) have been already precipitated out of the brine.

The following table illustrates typical brine concentrations at increasing densities:

| Density | | Mg, | Solution Composition, moles/1000 moles $H_2O$ | | | |
|---|---|---|---|---|---|---|
| °Be | g/cc | Wt. % | $MgSO_4$ | $MgCl_2$ | $K_2Cl_2$ | $Na_2Cl_2$ |
| 25.0 | 1.208 | 1.03 | 5.53 | 5.17 | 0.99 | 48.98 |
| 28.5 | 1.245 | 2.4 | 10.33 | 16.15 | 2.44 | 36.20 |
| 30.0 | 1.261 | 3.6 | 12.50 | 25.35 | 3.27 | 27.79 |
| 31.8 | 1.281 | 4.5 | 16.17 | 31.76 | 3.97 | 19.70 |
| 33.8 | 1.304 | 5.5 | 19.39 | 40.85 | 6.13 | 13.31 |
| 34.7 | 1.315 | 6.0 | 17.53 | 48.45 | 7.18 | 9.88 |
| 35.2 | 1.321 | 6.5 | 15.42 | 56.60 | 7.58 | 6.44 |
| 35.5 | 1.324 | 7.0 | 13.06 | 63.81 | 5.80 | 3.48 |
| 35.6 | 1.325 | 7.5 | 10.97 | 70.31 | 2.69 | 1.72 |

The aforementioned residual brine flows from the main salt plant and is combined in line 16 with a recycle stream 14. The stream 14 is supernatent liquor from a salt cake conversion step to be hereinafter described. The residual brine and supernatent liquor form the feedstock to the process of the present invention.

The combined feedstock flows through line 16 to a series of heat exchangers 12. The heat exchangers are designed so that the feedstock may be rapidly cooled from ambient to a temperature of less than 0° C. and preferably to a temperature of between 0° C. and −10° C. At such temperatures and at the preferred density of about 28.5° Be, glauber salt ($Na_2SO_4.10H_2O$) will be crystallized to the exclusion of unwanted salts such as epsomite ($MgSO_4.7H_2O$). (Reference: *International Critical Table of Numerical Data, Physics, Chemistry & Technology*, Published for the National Research Council by McGraw-Hill, New York, 1926–1930, p. 282 7 volumes plus index; *Kali and Steinsalz*, 1 (1955) No. 11, pp. 18–32.)

The rapidly cooled brine flows through line 18 to glauber salt crystallizers 20. Since the cooling must be sufficiently rapid through intermediate temperatures to avoid precipitation of epsomite, it can be seen that the crystallizers should also be equipped with suitable cooling means. Generally, by maintaining the large circulating magma in the crystallizers at the desired temperature, an entering feed stream will be quickly cooled to the preexisting temperature. In some cases, the heat exchangers 12 may not be necessary. Crystallization is also enhanced by insuring supersaturation by maintaining a large seed bed of glauber salt crystals.

Glauber salt crystals are separated from the mother liquor by centrifuging or the like (not shown) and the cold supernatent liquor is pumped through line 30 and used as a heat exchange medium by countercurrent flow through the aforementioned heat exchangers 12. In this way heat loss is minimized and the cooling step is rendered more energy efficient. The liquor exits the heat exchangers through line 32 and flows as the main feed stream to a series of solar evaporation ponds.

The glauber salt crystals are transported through line 22 to salt cake crystallizers 24. Here, the glauber salt is converted to salt cake ($Na_2SO_4$) by salting out with a recycle salt mixture incoming through line 26. The recycle stream comprises an aqueous mixture of sodium chloride and epsomite crystals from the reject underflow of flotation cells 66. Such crystals are preferably separated from the mother liquor underflow, washed, and recycled to line 26. Alternately, the glauber salt mixture can be subjected to a drying or evaporation treatment to yield salt cake.

The salt cake crystals from crystallizer 24 are separated from the mother liquor by centrifuging, filtering or the like and washed, dried and collected as product. The mother liquor therefrom is returned to the beginning of the overall process through line 14 described hereinabove.

Supernatent liquor recovered from the aforementioned glauber salt crystallization step enters successively four ponds which are shown schematically in the flow sheet. It will be appreciated that more ponds could be used depending on the type of salts present and the desired recovery products. The ponds are arranged to sequentially evaporate water from the entering feed stream liquor to thereby allow the selective harvesting of the desired salts.

The first or preliminary solar pond 40 produces sodium chloride alone. The sodium chloride (salt) is recovered by means known in the art and processed in the same manner as salt in the main salt plant. It will be understood that since a major portion of the sulfate ions have been removed from the feed stream liquor as salt cake, the sodium chloride is recovered in a purity comparable to that recovered in the main plant.

From the preliminary sodium chloride pond 40, the supernatent liquor flows to a second pond 42 whereby additional water is evaporated and sylvinite (KCl plus NaCl) precipitates in quantities suitable for effective recovery. Supernatent liquid from the sylvinite pond 42 flows to a third pond 44 wherein water is evaporated and mixed potash salts precipitate and are recovered therefrom by means known in the art. Generally, such mixed potash salts comprise varying amounts of kainite, carnallite and possibly some schoenite.

The supernatent liquor from the third pond is subsequently flowed to a fourth pond 46 which is a repository for the end liquor. Such liquor generally contains a high concentration of magnesium chloride which, if economics permit, can be recovered and/or converted to magnesia or other compounds in which a market may be found.

Referring back to pond 42, the sylvinite recovered is comminuted and classified at reference numeral 54 by means known in the art. Since the sylvinite is preferably handled as a sludge, it may be necessary to thicken it prior to its transport through line 56 to flotation cells 66. Generally, the sylvinite particles should be reduced to a size that can be effectively floated or otherwise treated.

Referring now to pond 44, the mixed potash salts are recovered by means known in the art and, with optional crushing and/or classifying pre-treatment, the salts are transported to a crystallizer 60. In the crystallizer, the mixed potash salts are converted to a crude schoenite mixture by the techniques discussed in U.S. Pat. No. 3,528,767 which is herein incorporated by reference.

The crude schoenite mixture leaves the crystallizers and is mixed with the pre-treated sylvinite from line 56 to form a primary mixture in line 62 which flows to the flotation cells 66. The flotation cells, known in the art, operate in conjunction with appropriate flotation reagents to effect a separation of schoenite and potassium chloride from unwanted reject salts. In this way the crude sylvinite and schoenite mixtures are purified and/or refined to produce an appropriate reaction mixture for a subsequent potassium sulfate conversion step. The reject underflow 68 from the flotation cells include materials suitable for the glauber salt salting-out step. Such recycle salt consists of an impure sodium chloride/epsomite mixture which, after appropriate pretreatment, is recycled to line 26 for use in the aforementioned salt cake crystallizer 24.

The refined overflow mixture flows through line 72 to crystallizer 80 whereby potassium sulfate is produced by metathesis and/or leaching reaction known in the art (note U.S. Pat. No. 3,528,767). The potassium sulfate is formed into crystals suitable for facilitating further handling such as drying and storage as a final product. The supernatent reaction liquor is preferably recycled to the schoenite crystallizers 60 through line 84.

While the invention has been described with respect to preferred embodiments, it should be understood that various changes may be made without departing from the spirit and scope of the invention which is particularly set forth and claimed hereinbelow.

I claim:

1. A process for recovering commercially valuable by-product salts from the residual brines of a solar salt plant comprising:
    rapidly cooling an initial brine feedstock having a density of less than 29° Be to a metastable condition at a temperature of less than about 0° C. whereby glauber salt is caused to crystallize;
    converting said glauber salt to salt cake by treatment with a salt recycle mixture;
    subjecting mother liquor from the glauber salt crystals to a sequential water evaporation treatment for the selective harvesting of salts from a plurality of at least three solar evaporation ponds connected in series comprising a first pond from which sodium chloride is recovered, a second pond from which sylvinite is recovered, and a third pond from which mixed potash salts are recovered;
    converting the mixed potash salts to schoenite by a crystallization treatment;
    forming a crude mixture of said schoenite and the sylvinite and refining said mixture by flotation treatment whereby reject material from said flotation includes said salt recycle mixture; and
    converting the refined mixture to potassium sulfate.

2. The process of claim 1 wherein said salt recycle mixture comprises a mixture of sodium chloride and epsomite and the salt cake is produced by salting out from glauber salt solutions.

3. The process of claim 1 including a fourth solar evaporation pond connected to the third pond to receive end liquor therefrom rich in magnesium salts.

4. The process of claim 2 wherein said brine feedstock has a density of about 28.5° Be and said temperature is within a range of about $-10°$ to $0°$ C.

5. The process of claim 1 wherein prior to its mixture with schoenite the sylvinite is reduced in size to enable it to be effectively separated with schoenite in the flotation treatment.

6. The process of claim 1 wherein said refined mixture is converted to potassium sulfate by metathesis reaction, or leaching or a combination of both.

7. The process of claim 6 wherein liquor from the potassium sulfate metathesis reaction and crystallization treatment is recycled for use in the mixed potash salt to schoenite conversion.

8. A method of obtaining valuable by-products from sea water or other bitterns comprising:
  imposing a metastable condition upon said bitterns under which glauber salt will precipitate leaving a first liquor having a diminished sulfate ion level;
  removing water from said first liquor until sylvinite precipitates leaving a second liquor;
  removing water from said second liquor until a mixture of potash salts precipitate;
  recovering the precipitates of said sylvinite and said mixture of potash salts from the corresponding first and second liquors;
  converting the mixture of potash salts to schoenite;
  forming a primary mixture with said sylvinite and said schoenite and reacting said primary mixture to form potassium sulfate and a third liquor; and,
  recycling said third liquor to the schoenite conversion step.

9. The method of claim 8 wherein salt and epsomite are recovered from said third liquor and mixed with said glauber salt to form sodium sulfate product.

10. The method of claim 9 wherein said metastable condition is imposed by providing bitterns having a specific gravity less than 29° Be and rapid cooling of said bitterns to less than 0° C.

11. The method of claim 10 wherein water removal from the first and second liquor is carried out in corresponding first and second solar evaporation ponds.

12. The method of claim 11 wherein said first liquor is initially concentrated by water removal in a preliminary solar pond to effectively precipitate sodium chloride out of said liquor prior to further water removal in the first solar evaporation pond.

13. The method of claim 12 wherein the initial water removal is carried out until said first liquor reaches a specific gravity of about 32.5° Be.

14. The method of claim 8 wherein prior to forming the primary mixture said sylvinite is comminuted and classified to an effective size and said schoenite is formed into effective sized crystals including the step of purifying the primary mixture by flotation means whereby potassium chloride in the sylvinite and the schoenite crystals will float away from other salts contained in said primary mixture.

15. The method of claim 8 wherein wherein said glauber salt is converted to sodium sulfate by evaporation of water.

16. A process for recovering potassium sulfate and sodium sulfate from salt-rich aqueous liquids comprising:
  A. Producing sodium sulfate by
    1. maintaining said liquids in a glauber salt metastable crystallization zone;
    2. forming glauber salt crystals in said liquids;
    3. contacting said glauber salt crystals with a recycle mixture containing NaCl and MgSO$_4$ to form sodium sulfate crystals and a first liquor; and,
    4. recovering said sodium sulfate crystals from said first liquor.
  B. Producing potassium sulfate by
    1. removing water from said first liquor until salts containing potassium precipitate in at least two separate stages to form at least a first sylvinite-rich fraction and a second mixed potash salt fraction;
    2. forming a mixture with said first fraction and schoenite;
    3. reacting said mixture to produce potassium sulfate;
    4. recovering said potassium sulfate from the reaction mixture of B.3.

17. The process of claim 16 wherein steps A.1 and B.1 are carried out by solar pond evaporation of water.

18. The process of claim 17 including the step of forming the schoenite from said second mixed potash salt fraction.

19. The process of claim 18 including the steps of, after step B.2 and before step B.3, refining the mixture of said first fraction and schoenite by flotation; and, forming the recycle mixture of step A.3 from reject liquor of said flotation.

20. The process of claim 17 wherein NaCl is precipitated from said first liquor prior to precipitating said salts containing potassium.

21. The process of claim 16 wherein said potassium sulfate is recovered by forming crystals thereof in an aqueous medium and separating said crystals from said medium.

22. The process of claim 16 wherein said metastable zone is maintained by concentrating said liquids to a density of about 29° Be or less and rapidly cooling said liquids to a temperature of about 0° C. or less.

23. The process of claim 1, 10 or 22 including the step of maintaining a seed bed of glauber salt crystals during the crystallization thereof.

* * * * *